Dec. 25, 1928.　　　　G. W. HEGEL ET AL　　　　1,696,603
CARBURIZATION OF METALS
Filed Aug. 26, 1926
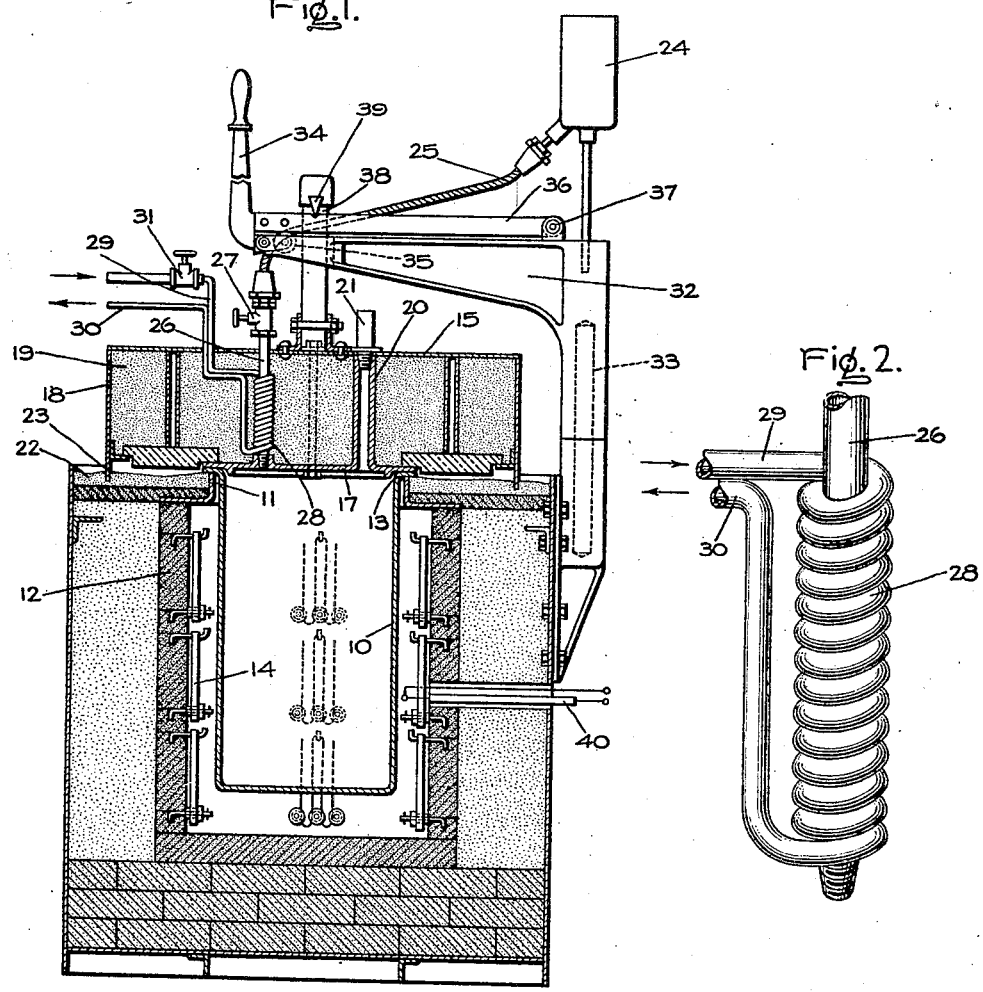
Inventors:
George W. Hegel,
Gerald R. Brophy,
by
Their Attorney.

Patented Dec. 25, 1928.

1,696,603

UNITED STATES PATENT OFFICE.

GEORGE W. HEGEL, OF SCHENECTADY, AND GERALD R. BROPHY, OF NISKAYUNA, NEW YORK, ASSIGNORS TO GENERAL ELECTRIC COMPANY, A CORPORATION OF NEW YORK.

CARBURIZATION OF METALS.

Application filed August 26, 1926. Serial No. 131,772.

Our invention relates to the carburization of metals and has for its object a method of carburizing and the provision of a liquid producing a reliable and effective carburizing atmosphere.

More particularly our invention relates to the art of carburizing ferrous metals, such as low carbon steels, to form a surface layer of high carbon steel which may be suitably hardened to form a wearing surface. Our invention has special reference to those carburizing methods wherein the carburizing atmosphere is formed by the vaporization of a suitable liquid containing carbon.

We have found when the carburizing process is carried out to the exclusion of air, as in an air-tight heating retort, such as described and claimed in a copending application of Carl L. Ipsen, Serial No. 125,548, filed July 28, 1926, now Patent Number 1,661,831, dated March 6, 1928, and assigned to the same assignee as this invention, that unless temperatures are maintained which are so high as to be detrimental to the steel, but little carburizing or cementation action takes place when using certain liquids containing carbon but lacking in oxygen, such as petroleum products, turpentine, linseed oil, tar, etc. In other words, a small amount of oxygen, sufficient to form the essential carburizing gas, CO, such as might be supplied by the admission of air, appears to be essential for carburization at the usual temperatures when using a liquid carburizing material of this character.

We have also found that certain liquids have the property of making the gases from such carbon containing liquids extremely active as carburizing agents. One of these liquids is bone oil, which when used in small quantities with carbon containing liquids of the character previously mentioned produces a very active carburizing atmosphere when the liquids are vaporized by heat, such as the heat of the retort or heating chamber. Bone oil may also be used alone as a carburizing liquid since it possesses both carbon and other elements necessary to make an active gas. Nitrobenzene, sometimes known as oil of mirbane, may also be used with such carbon containing liquids to produce an active carburizing gas when air is excluded. The quantity of bone oil or nitrobenzene may be relatively small as compared with the amount of carbon containing liquid used. The relative proportions will probably be determined largely by the cost of the materials, preference being given to the more inexpensive ones.

We have found, in fact, that any material whether a gas, liquid or solid which liberates oxygen, CO, $CO_2$, or any combination of these may be used with a carbon containing liquid to produce an active gas where air is excluded. The addition also of a substance yielding nitrogen speeds up the carburizing process. We designate these materials by the general term of "energizers" on account of their property of producing or aiding cementation when added to a carbon containing liquid which would be more or less inert when air is excluded. By "energizers" we mean any substance which when heated liberates gases having the property of reacting with the hydrocarbon gases, or themselves reacting with the carbon to form more active carburizing gases.

Although the energizer material may be admitted in any suitable manner, it is preferably mixed with the carbon containing liquid since in this way the presence of a definite predetermined quantity of the energizer is assured and a gas of uniform quality obtained.

In certain cases it may be desirable to use both bone oil and oil of mirbane with the carburizing liquid. We have found, for example, that a mixture by volume of 8 parts of bone oil, 8 parts of kerosene, and 2 parts of oil of mirbane makes a very active carburizing atmosphere.

As previously noted the use of our energizer materials with the carburizing liquid produces an extremely active gas whereby cementation takes place very rapidly. Another advantage is that the cementation process can be very accurately controlled since predetermined conditions can be reproduced and maintained. By carburizing for a definite length of time, as determined by experiment, a predetermined depth of cementation can be obtained with great uniformity. Furthermore, the cementation action takes place with equal rapidity over the entire area of the articles being treated so that a surface of uniform carbon content is obtained.

For a more complete understanding of our invention reference should be had to the accompanying drawing in which Fig. 1 is a view mainly in section of carburizing apparatus embodying our invention, while Fig. 2 is an enlarged fragmentary view showing details of construction of the liquid supply nozzle.

Referring to the drawing, we have shown carburizing apparatus such as described and claimed in the aforesaid copending application of Carl L. Ipsen Serial No. 125,548, although it will be understood that any suitable apparatus may be used. Since the apparatus forms no part of our invention, it will be described but briefly. The charge to be carburized is placed in a cylindrical retort 10 which is set into a furnace heating chamber having an opening or throat 11 at the top and defined by heat refractory bricks 12, the retort being provided with a peripheral flange 13 at the top which rests on the edge of the furnace chamber whereby the retort is supported. The furnace is heated in any suitable manner, for example by means of electric heating units 14 supported on the wall of the furnace around the retort. The retort is closed by means of a heat insulated cover 15. This cover comprises a metallic plate 17 which fits tightly on the retort a ground joint being provided, and an outer casing 18 to which the plate 17 is secured, the casing being filled with powdered heat refractory insulating material 19. A vent is provided in the cover by casting a pipe 20 integral with the plate 17. This pipe extends through the cover to the casing which is secured to it by means of a short pipe 21 having one end threaded and screwed into the threaded upper end of the pipe 20, the pipe being provided with a flange which is seated against the casing. A sand seal is provided for the furnace chamber consisting of a layer of sand 22 around the upper end of the retort into which extends an annular flange 23 on the cover.

The carburizing liquid is fed into the retort by gravity from an elevated tank 24 through a flexible pipe 25 and a nozzle 26 which extends through the cover. The rate of flow of the liquid may be controlled by means of a valve 27. In order to prevent clogging of the nozzle by the residue of carbon which may be left upon disintegration of the liquid when exposed to the high temperature in the retort, cooling means is provided for the nozzle, this means being shown as a pipe 28 which is wound around the nozzle in a helix. The ends of the pipe 28 project from the cover, and one end, for example the end 29, will be connected to a water supply source of suitable pressure and the other end 30 to a drain. A valve 31 is provided whereby the cooling water supply can be controlled. This cooling means maintains the nozzle at a comparatively low temperature so that the carburizing liquid drips free from the orifice of the nozzle before disintegration begins. As a result no residue of carbon is left on the nozzle.

In order to facilitate the removal of the cover an arm 32 is provided which can be swung over the furnace about a vertical pivot 33. The outer end of this arm is forked to form two parallel projections between which a bell crank 34 is pivotally mounted. The short arm of the bell crank 34 terminates in a roller 35 which engages with an arm 36 having one end pivotally secured to the arm 32 at a point 37. A post 38 extends centrally from the cover 15 between the forked projections of the arm 32 and terminates in a pivot bearing 39 resting on the arm 36. In order to remove the cover the bell crank 34 is pulled down whereby the roller 35 is lifted to tilt the arm 36 about its pivot 37 and thereby raise the cover. The cover may then be swung to one side about the pivot 33. This operating means for the cover is described and claimed in a patent to Albert N. Otis, 1,646,213, assigned to the same assignee as this invention.

In carrying out the carburizing process the charge to be carburized is placed in the retort 10 and heated to a suitable carburizing temperature somewhat above the critical temperature or decalescence point of the material. A temperature of approximately 1700° F. is very satisfactory. The temperature of the charge may be determined by means of a suitable temperature indicator, such as a thermocouple 40 inserted through the side wall of the furnace into close proximity with the retort. When the charge has been heated to the desired carburizing temperature, the valve 27 is opened to allow the carburizing liquid to run into the retort where it is quickly gasified by the high temperature. The carburizing liquid is preferably fed into the retort continuously throughout the carburizing period of from 1 to 6 hours depending upon the depth of penetration of carbon desired. The rate of flow of the carburizing liquid is regulated so as to maintain a slight gas pressure in the retort whereby the entrance of air through the pipe 21 is prevented. This condition is indicated by the escape of gases from the outlet of the pipe 21. If desired the escaping gas may be ignited. The liquid ordinarily flows in a small stream or drips drop by drop from the orifice of the nozzle 26. The amount of the liquid used seems to bear but little relation to the size of the charge in the retort which is probably due to the fact that only a small part of the carbon content of the carburizing liquid is actually used in the cementation process. The important thing is to maintain the carburizing atmosphere to the exclusion of air, which condition is indicated by the escaping of gas. A substantially constant temperature is maintained in the retort throughout the carburizing process, preferably by means of suitable automatic control mechanism associated with the electric heating circuit.

We have found that the cementation action takes place with such rapidity that a high concentration of carbon is formed at the surface. The carbon content at the surface may be as high as from 1.2 to 1.30%. For certain classes of work, for example, where the surface of the article is to be ground off, this high surface concentration of carbon is desirable, since the concentration of carbon decreases inward and the removal of the surface will expose steel having the desired lower carbon content. Ordinarily, however, a carbon content at the surface of from .9 to 1.1% is preferable, since this carbon content gives a steel which has the most desirable characteristics of toughness and hardness upon being quenched and hardened. It is usually desirable, therefore, in accordance with out invention, to give the charge a heat treatment in order to produce diffusion of the carbon from the surface into the interior and thereby reduce the carbon content at the surface to the desired amount of from .9 to 1.1%. This final heat treatment may be carried out in the carburizing furnace or in any suitable separate furnace as desired. Preferably, it is carried out in the carburizing furnace and to this end the carburizing liquid is shut off after the desired cementation action has taken place, whereby little, if any, further carburizing takes place, and the charge then heated for a predetermined period as determined by experiment, the temperature being maintained as before. This period of final heat treatment in order to cause diffusion of the carbon of course varies with the amount of concentration of carbon and with the extent of diffusion desired and as previously stated may be determined by experiment. In certain instances we have found that a final heat treatment for a period of substantially one-half the length of the cementation period gives a very satisfactory surface layer of high carbon steel.

After the carburizing process, which includes the subsequent heat treatment to produce diffusion if desired, the surface layer of high carbon steel is hardened by suitable heat treatment. The steel may be quenched to harden it immediately upon removal from the carburizing furnace or it may be allowed to cool slowly and thereafter heated and quenched to harden it, as desired.

While we have described our invention as embodied in concrete form and as operating in a specific manner in accordance with the provisions of the patent statutes, it should be understood that we do not limit our invention thereto since various modifications thereof will suggest themselves to those skilled in the art without departing from the spirit of our invention the scope of which is set forth in the annexed claims.

What we claim as new and desire to secure by Letters Patent of the United States, is:

1. A carburizing material having a mixture of a liquid containing combined carbon with a material having the properties of an energizer.

2. A carburizing liquid consisting predominently of a liquid containing combined carbon, and a small amount of oil of mirbane as an energizer.

3. A carburizing liquid having linseed oil and oil of mirbane.

4. A carburizing liquid containing bone oil.

5. A carburizing liquid having a mixture of linseed oil and bone oil.

6. A carburizing liquid including a mixture of a liquid containing combined carbon and bone oil.

7. A carburizing liquid comprising a mixture of kerosene oil, bone oil, and oil of mirbane.

8. A carburizing liquid comprising a mixture by volume of approximately 8 parts of bone oil, 8 parts of kerosene, and 2 parts of oil of mirbane.

In witness whereof, we have hereunto set out hands this 24th day of August, 1926.

GEORGE W. HEGEL.
GERALD R. BROPHY.